(12) United States Patent　　(10) Patent No.: US 8,174,776 B2
Campbell et al.　　　　　　　　(45) Date of Patent: May 8, 2012

(54) ARRAY OF CONCENTRATING LENSES AND METHOD OF MANUFACTURE

(76) Inventors: James P Campbell, Atherton, CA (US); Harry R Campbell, Los Gatos, CA (US); Ann B Campbell, Los Gatos, CA (US); Joel F Farber, San Jose, CA (US)

( * ) Notice: Subject to any disclaimer, the term of this patent is extended or adjusted under 35 U.S.C. 154(b) by 4 days.

(21) Appl. No.: 12/776,401

(22) Filed: May 9, 2010

(65) Prior Publication Data

US 2011/0273783 A1　　Nov. 10, 2011

(51) Int. Cl.
*G02B 3/02* (2006.01)
*F24J 2/08* (2006.01)

(52) U.S. Cl. .......................... 359/708; 126/698
(58) Field of Classification Search .................. 359/708, 359/718, 719
See application file for complete search history.

(56) References Cited

U.S. PATENT DOCUMENTS

| | | | |
|---|---|---|---|
| 4,530,576 A * | 7/1985 | Pinelli et al. .................. 359/742 |
| 5,114,628 A | 5/1992 | Hofer et al. | |
| 5,502,518 A | 3/1996 | Leiberman | |
| 5,857,041 A * | 1/1999 | Riser et al. ...................... 385/31 |
| 6,700,055 B2 | 3/2004 | Barone | |
| 6,804,062 B2 | 10/2004 | Atwater et al. | |
| 6,959,993 B2 | 11/2005 | Gross et al. | |
| 7,077,361 B1 | 7/2006 | Rabinowitz | |
| 7,190,531 B2 | 3/2007 | Dyson et al. | |
| 7,192,146 B2 | 3/2007 | Gross et al. | |
| 7,391,939 B1 | 6/2008 | Williams | |
| 7,611,648 B2 | 11/2009 | Wolfing et al. | |
| 7,638,708 B2 | 12/2009 | Fork et al. | |
| 2003/0206342 A1 * | 11/2003 | Reed et al. ..................... 359/460 |
| 2003/0210462 A1 * | 11/2003 | Freese et al. .................. 359/455 |
| 2004/0008411 A1 * | 1/2004 | Freese et al. .................. 359/460 |
| 2006/0170810 A1 * | 8/2006 | Kim ................................ 348/340 |
| 2008/0223443 A1 | 9/2008 | Benitz et al. | |
| 2010/0269886 A1 * | 10/2010 | Argenter ....................... 136/246 |
| 2010/0278480 A1 * | 11/2010 | Vasylyev ........................ 385/33 |

OTHER PUBLICATIONS

Sinke, Wim C. et al. "A Strategic Research Agenda for Photovoltaic Solar Energy Technology" Luxembourg: Office for Official Publications of the European Communities, 2007 ISBN 978-92-79-05523-2.

* cited by examiner

*Primary Examiner* — Scott J Sugarman

(57) ABSTRACT

The method described provides a unique solar energy concentrating structure. This structure is intended to be employed in conjunction with complementary high efficiency solar cell elements to produce solar electric power. In its usual embodiment it contributes to a system of exterior window concentrators and solar cells that provide good visibility and control excess heat transmission providing benefits beyond low-e glass performance.

5 Claims, 3 Drawing Sheets

FIG. 2
AN ASYMMETRIC ASPHERIC LENS
FIG. 2A
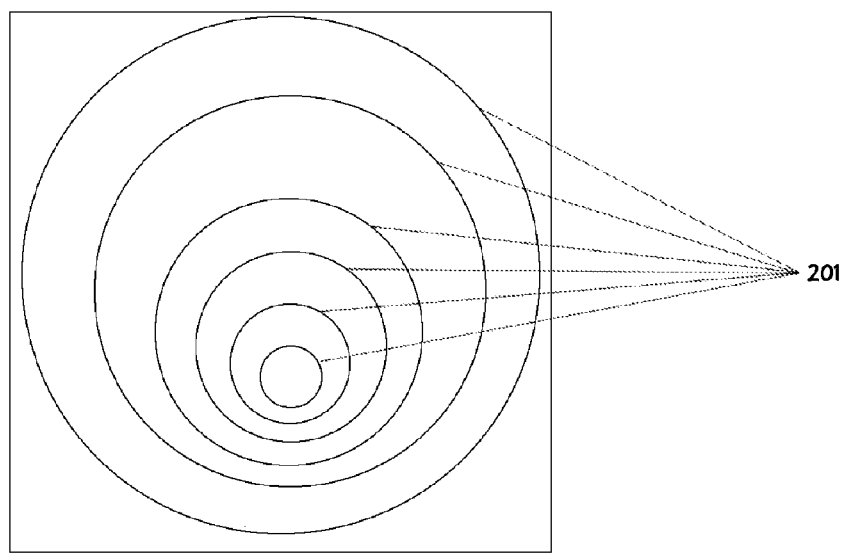
FIG. 2B
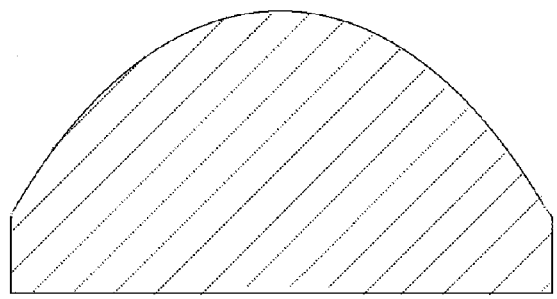
FIG. 2C
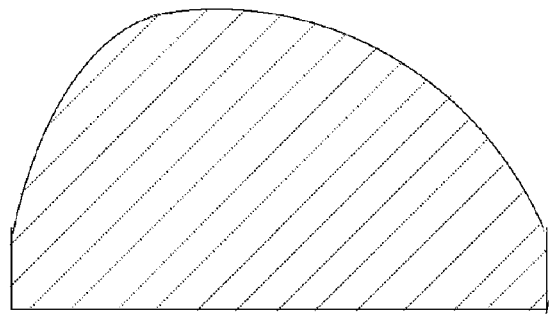

FIG. 3
ARRAYS OF ASPHERIC ASYMMETRIC LENSES
FIG. 3A
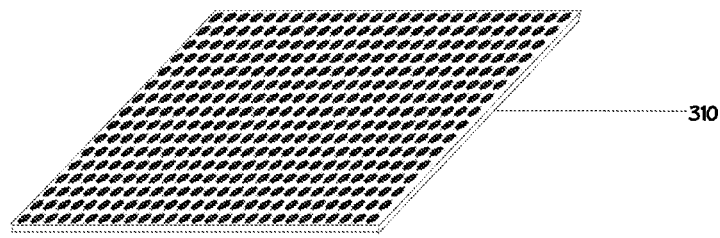
310
FIG. 3B
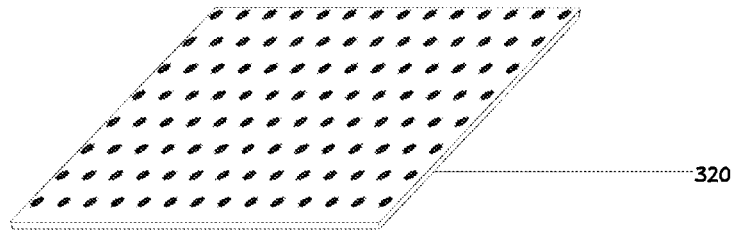
320
FIG. 3C
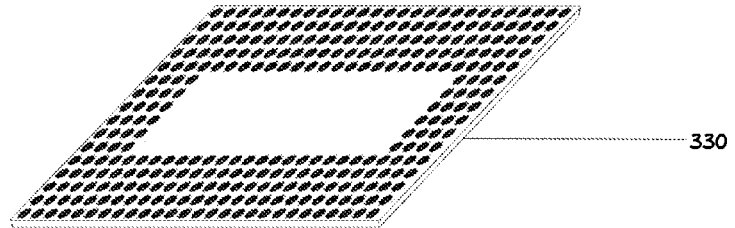
330

ARRAY OF CONCENTRATING LENSES AND METHOD OF MANUFACTURE

FIELD OF THE INVENTION

The present invention relates generally to solar concentrators, and more specifically to solar concentrators optimized to collect and concentrate solar energy while stationary.

DESCRIPTION

The method described provides a unique solar energy concentrating structure. This structure is intended to be employed in conjunction with complementary high efficiency solar cell elements to produce solar electric power. In its usual embodiment it contributes to a system of exterior window concentrators and solar cells that provide good visibility and control excess heat transmission providing benefits beyond low-e glass performance.

BACKGROUND OF THE INVENTION

Most solar cells on the market today are a sandwich of a solar collector below a clear protective substrate, most often plain glass. This invention teaches advanced optics positioned directly above solar collector(s) of a complementary design, whose objective is to increase the level of solar energy harvested by those cells while, depending on the application, predominantly maintaining visual transparency of the device.

Standard lenses are rotationally symmetrical and often spherical. Another commonly used lens is the Fresnel lens. These are not the optimum configuration to capture the maximum solar energy from the sun's arch overhead in the sky. A stationary lens system optimized to capture the maximum sunlight during a day from the sun needs an asymmetrically aspheric surface topology. This invention employs an aspheric lens because it has the widest acceptance angle. The asymmetry is required to optimize the acceptance of sunlight from various latitudes when the lens is part of a vertical structure.

Aspheric means that the radius of curvature along a lens "meridian" (which is an imaginary line on the lens surface passing through the geometric center of the lens, analogous to a geographic meridian) need not be a constant. Indeed, the lens curvature flattens progressively from the geometric center to the periphery. Asymmetric means that the profile of the lens curvature along a half-meridian is not the same as (i.e., it is not a mirror image of) the other half of the same meridian. The degree to which lenses are aspheric and/or asymmetric needs to vary depending on the position on the earth (by application) to maximize the total solar energy gain.

PRIOR ART

Many solar concentrators comprise a single optical element, such as a single lens, mirror, or reflector. Examples of such concentrators include dish and trough concentrators. Other solar concentrators comprise an array of optical elements that are individually or collectively adjustable to track the position of the sun in the sky. One predominant type of arrayed concentrator is the "heliostat array". In a heliostat array, a field of reflective optical elements concentrates solar energy on a collector having dimensions that are small compared to the dimensions of the array. The orientation of the optical elements in a heliostat array can be individually adjustable by control circuitry, thereby allowing the focal point of the array to remain on the collector over the course of a day and during different seasons. Such an arrangement is often referred to as a "tracking" heliostat array.

In a conventional tracking heliostat array, configuring each optical element to be individually movable typically requires a large amount of expensive motorized equipment and control circuitry. For example, in one conventional configuration, two motors are used to adjust the orientation of each element in the tracking heliostat array. Thus, using this configuration, a tracking heliostat array comprising a 10 by 10 array of mirrors uses 200 motors to adjust the orientation of the mirrors. In addition to causing the array to be undesirably expensive, this large amount of motorized equipment results in an array that is relatively heavy, which is particularly disadvantageous for applications where weight is a significant factor, such as for rooftop mounted applications. These devices are also complex requiring extensive ongoing maintenance, which implies cost, trained personnel, spare parts reserves, downtime, etc., all of which are undesirable for all solar power supplying applications.

Conventional technologies used for the generation of solar power include building-integrated photovoltaic (BIPV) solar systems and 'stand-alone' concentrating PV systems. Although these technologies work, widespread adoption of these solar powered systems for general use has been hampered by a number of impediments:

The viability of the 'stand-alone' concentrating PV systems has been hindered by the cost and the appearance of the large tracking structures required for their implementation. This not only increases the cost payback period, it excludes them from application to sites that would most benefit from their energy production. That is, the large and unsightly appearance of the structures substantially limits their potential for widespread application to building properties. Furthermore, the stand-alone concentrating PV systems suffer from wind loading effects due to their large size.

Tall buildings often have small roof areas limiting the useful energy that can be produced by rooftop solutions. Some other BIPV systems are relatively expensive and inefficient and have long cost payback periods. Most embodiments of the present invention focus on integrating concentrator PV technology into existing structural and environmental systems of buildings, thereby removing the need for large, costly additional structures and tracking devices.

U.S. Pat. No. 5,114,628 discloses aspherical lenses made using topographic data to control a lathe. (The data provide information on the slope of the surface at different points on the lens but are based on measurements in two dimensions interpreted three-dimensionally.) The resultant lens is aspherical (in both the anterior and posterior surface) but inherently symmetrical. Lenses that are designed as a hybrid of spherical and aspherical curves, result in lens surfaces that are rotationally symmetrical and therefore these lenses are not asymmetrical and aspheric.

SUMMARY OF THE INVENTION

The use of this invention will be in the efficient collection of solar energy while providing good visibility through the device. It may be used as an integral part of a transparent or semi-transparent solar collection panel whose collection elements are configured to complement the array of lenses. The intended use is primarily in a system of window modules providing substantially unobstructed views of the outside.

This invention employs an aspheric lens because it has the widest acceptance angle relative to the position of the sun. The asymmetry is required to optimize the acceptance of sunlight from various latitudes when the lens is part of a vertical structure. The total effect is to produce the most efficient collection method for solar energy available for nominally vertical structures with the low total cost and high reliability.

The window modules are usually integrated and distributed within a building envelope, preferably in the exterior of the building envelope. By integrating and distributing the collecting system within the building exterior, several advantages may be obtained compared to a stand-alone PV system. Locating and distributing the window modules within a building exterior provides a power generating system with a large area covered by the PV concentrator modules, since a building exterior has a large surface area, especially a multistory building. The area covered by the PV concentrator modules can be much greater than an area covered by the stand-alone PV systems. Thus, the power generation system can provide a larger power output due to the increased area covered by the PV concentrator modules. Also, integrating the modules within the building envelope, such as inside windowpanes in a building's exterior, protects the modules from the adverse effects of wind loading. Third, distributing the modules between windowpanes provides pleasing, diffuse light into the building interior. Of course, if desired, the modules may also be located on the roof of a building in addition to a building's exterior.

Concentrator PV systems should face in the direction of incoming solar rays during operation, predominantly south in the northern hemisphere. They also should have large surface areas 'collecting' direct sunlight, which should then be focused into many small points to capture the light energy for electricity.

Within building envelopes, the proposed system seamlessly integrates concentrating PV technology into the interior shading systems of existing buildings. This placement renders the technology almost invisible, while also allowing it to further reduce energy consumption of the building, thereby compounding the cost savings for the user.

Preferably, these design features are integrated from the inception of the design process and optimized for seasonable performance while being addressed by the architectural aspects of the design. In one aspect of the invention, the system design can be attached to a range of existing building structures or implemented into new designs. Further, as a distributed system, this approach can capitalize on existing structures as support and protection for a system thereby reducing cost.

The advantage and novelty of this invention is that it provides a solution for efficient, reliable, low maintenance solar energy production using static placement on building elements, whether vertical or otherwise. By using asymmetric aspheric lenses additional mechanisms to move the lens array have been eliminated. The semi-transparent or transparent final device, the method of manufacture, the unique customization of the lens shape and array density all contribute to its novelty. Although the lens system described can be augmented by reflective devices, its primary role is in window and solar devices intended to be used as part of a vertical window solar collection system.

BRIEF DESCRIPTION OF THE DRAWINGS

FIG. 2 shows three views of a typical asymmetric aspheric lens(s).

FIG. 2A depicts the top view of a typical asymmetric aspheric lens(s). Lines 201 are contour lines of the complex slopes of the asymmetric aspheric lens.

FIG. 2B depicts a side view of the lens in FIG. 2A showing a typical aspheric shape.

FIG. 2C depicts the other side view of the lens in FIG. 2A showing the asymmetry of the lens.

FIG. 3 depicts portions of three possible arrays of multiple asymmetric aspheric lens elements.

FIG. 3A depicts a relatively dense arrangement of lens elements in an array.

FIG. 3B depicts a relatively sparse arrangement of lens elements.

FIG. 3C depicts an example of a patterned arrangement of lens elements.

DETAILED DESCRIPTION OF THE INVENTION

Figure 1:
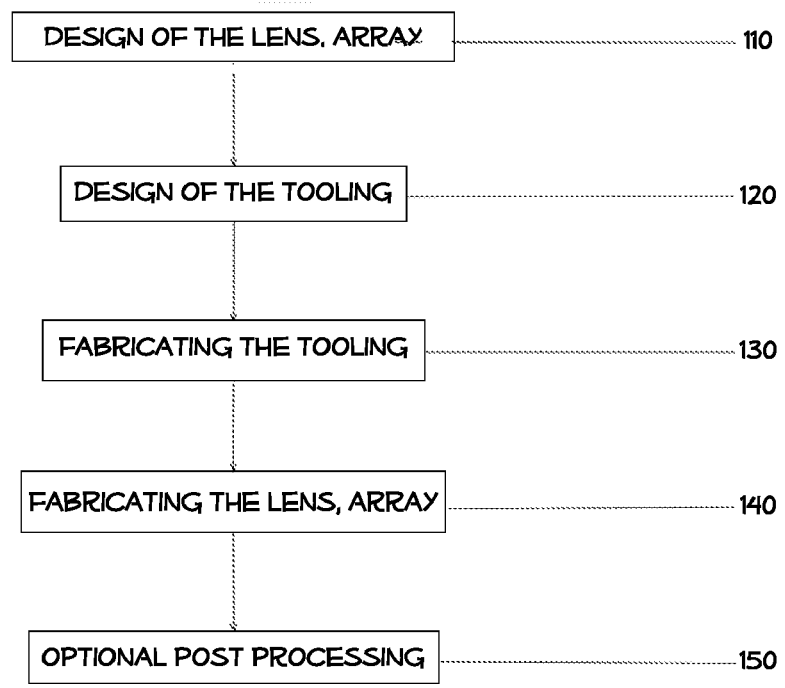
FIG. 1 is a flow diagram showing the process for fabricating asymmetric aspheric lens(s) and arrays according to the present invention.

The solar concentrating elements are an array of asymmetric aspheric lenses in one planar layer, in some embodiments. In a usual embodiment, this concentrating layer can be manufactured by pressure forming asymmetric lenses into a glass structure of approximately 1 mm thickness or formed into glass, plastic or other transparent materials. The lenses will be spaced to optimize efficiency and transparency and cover a large portion of the surface. The diameter of the lenses will be such that their focal length and the thickness of the substrate (glass or plastic) shall be such as to maximize the efficiency of solar energy focused below. Example: a 750µ glass structure will usually have 750µ focal length lenses.

In one embodiment depicted in FIG. 3: The lens' has a diameter at the base of about 0.1mm to about 100mm, and a height of about 0.1mm to about 10mm. The lenses may be additionally modified or coated to optimize or block solar energy in selected wavelengths. In this embodiment the array of lenses are coplanar. The lenses are optimized to deliver the solar energy at or near the anterior surface of the lens. Multiple instances of the lens are employed in an array to concentrate solar energy over a larger area, these elements of asymmetric aspheric lenses are organized in various configurations. The lenses are shaped and configured to maximize solar energy concentrated both from direct sunlight and supplementary reflectors.

In this embodiment the configuration of the lenses enables the amount and concentration of light passing through the solar concentrating complex to be modified via the size and placement of the solar concentrator elements, depending on the application requirements. The configuration of the lenses is such that the array is transparent or translucent, depending on the application requirements. The geometry and orientation of concentrator lenses are varied, as well as the shape of the aspheric and asymmetric properties of the lenses, to optimize the solar energy concentrated, depending on the application requirements. The number of concentrator lenses, and their density in the array, may be varied from one area of the array to another, thus providing varied light transmission depending on the application requirements.

A method and process for manufacturing asymmetric aspheric concentrating lens elements of the present invention is illustrated in FIG. 1.

The process begins with the design of the lens, array 110, which specifies lens(s) shape design and placement of the lenses in an array. This employs optical design software. Examples of contemporary commercially available optical design software suitable for this function would be: Optical Research Associate's CODE V or Breault Research's ASAP. While packages such as these provide sophisticated optical design, materials considerations, focal lengths, etc., the output of these design packages may need to be adapted to describe the asymmetrical aspheric aspect of each lens.

Design of the lens requires generating three-dimensional topographic design data, including elevation data, for a multiplicity of points for each lens' shape to be formed, and this data providing dimensions on both aspheric and asymmetric properties of the lens and if multiple lenses are employed, their individual positioning in the array.

The inputs to design of the lens, array 110 are primarily determined by the approximate latitude and orientation of the building relative to the sun's path, and angle of the application (if not intended for a vertical application). The array may be planar or have a more complex shape, depending on the specific application requirements. Other inputs to the program may include average temperature expected, materials employed, coatings or other treatments, etc. Care is taken in this lens and array design process to ensure the optimized concentration and focus of solar energy on the intended target.

The required visual clarity or array transparency to be maintained for this application may also be utilized as input to the algorithms to determine the density, orientation, and placement of the lenses in the array.

The lens shape design process generates a three dimensional topographic map of a lens element (FIG. 2), and its position in the array FIG. 3. For this purpose, both slope (contour-line) and elevation data are required output. In FIG. 2A, contour lines 201 have been shown as delineated by a sharp line. In an actual lens element manufactured according to the present invention, the lens element will be blended (i.e. smooth, without sharp edges).

Design of the tooling requires generating a lens-shape forming tool design based on the data from the prior step, and on characteristics such as tolerances required, thermal coefficient of expansion, etc., of the materials and process selected.

The design of the tooling 120, employs a Computer Aided Design System, for instance Autodesk's AutoCAD or IBM's CATIA, or equivalent which designs, and may also operate the facilities to fabricate the tooling 130.

Fabricating the tooling requires a forming tool, made of steel or other suitable material, is fabricated in response to the specifications from the prior step.

Input to fabricating the tooling 130, includes topographic data describing the surface of the lens to be shaped, from both the optical design software and the design from the Computer Aided Design system. A CAD system or equivalent generates a sequence of commands/control signals utilized by the fabricating tool. A CAD system or equivalent creates and can operate (directly or indirectly) a sequence of commands that describe the movements in three dimensions (X, Y, Z in any one of Cartesian, radial or spherical coordinates) of the fabricating tool system to shape each particular lens element. The lens or array may be indirectly or directly machined via CAD process, or a mold form (batch or continuous process) may be created for subsequent casting or other equivalent fabricating processes, such as photolithographic etching.

In fabricating the lens, glass, or other suitable lens material, is formed into the lens, at a transition temperature making it plastic and able to be permanently formed, is pressed, cast, or formed by any other suitable method, in the forming tool, thus fabricating an asymmetric aspheric lens or an array of said lenses.

This tooling is then employed by fabricating the lens, array 140 to produce the lenses and arrays, which are then optionally post processed 150. Optional post processing could include cutting the lens array into appropriate sizes and shapes and the lenses or lens array may be polished, annealed, coated or additionally post-processed as required, depending on the application.

Arrays of lenses may have a curvature and topology that is configured to maximize solar energy concentrated for the application.

The foregoing description of the invention has been presented for purposes of illustration and description. It is not intended to be exhaustive or to limit the invention to the precise form disclosed, and modifications and variations are possible in light of the above teachings or may be acquired from practice of the invention.

The drawings and description were chosen in order to explain the principles of the embodiments of the invention and its practical application. It is intended that the claims and terms thereof be interpreted to protect the invention to the broadest extent permitted by the prior art and the applicable law.

What is claimed is:

1. An optical solar concentrator comprising: an asymmetric and aspheric lens for concentrating solar energy when the lens is positioned on or in nominally vertical surfaces; said lens being aspheric to provide a wide angle of acceptance and asymmetric to provide orientation toward the sun; said lens used in an array of lenses where the lenses are spaced in the array to allow the unobstructed transmission of light between the individual lenses, thus giving the characteristic of transparency to the array, the degree of transparency being dependent upon the size of the individual lenses in the array and the density of placement of the lenses in the array; said lens having the characteristic of delivering concentrated solar energy at or near the posterior surface of the lens.

2. The lens of claim 1 wherein said lens is shaped and configured to maximize solar energy concentrated from sunlight by having the lens orientation and shape design based on the positioning of the installation relative to the sun's path through the sky at the latitude of the installation.

3. The array of lenses in claim 1 wherein the number of concentrator lenses, and their density in the array, may be varied from one area of the array to another, thus providing varied degrees of transparency from one area of the array to another.

4. A method for making solar concentrating asymmetric aspheric lenses and/or arrays by a process comprising the steps of:
   a. designing the lens or lenses by generating three-dimensional topographic design data, including elevation data, for a multiplicity of points for each lens' shape to be formed, and said data providing dimensions on both aspheric and asymmetric properties of said lens and when multiple lenses are employed, their individual positioning in the array;
   b. designing the tooling by generating a lens-shape forming tool design based on the data from the prior step a. and on characteristics comprising: tolerances required, thermal coefficient of expansion of the materials and fabrication process selected;
   c. fabricate the tooling by forming a tool, using the specifications from the prior step b.;
   d. fabricating the lens using materials comprising glass or plastic which are formed into said lens, by a method comprising pressing or casting, in the forming tool, thus fabricating an asymmetric aspheric lens or an array of said lenses.

5. The method of claim 4 further having optional steps comprising: cutting the lens array into appropriate sizes and shapes, polishing, annealing, or coating the lenses.

\* \* \* \* \*